No. 678,717. Patented July 16, 1901.
H. CARPENTER.
DRAFT EQUALIZER.
(Application filed May 13, 1901.)

(No Model.)

WITNESSES:
W. R. Edelen.
Perry B. Turpin.

INVENTOR
Henry Carpenter
BY Munn & Co.
ATTORNEYS

UNITED STATES PATENT OFFICE.

HENRY CARPENTER, OF EDMOND, OKLAHOMA TERRITORY.

DRAFT-EQUALIZER.

SPECIFICATION forming part of Letters Patent No. 678,717, dated July 16, 1901.

Application filed May 13, 1901. Serial No. 59,960. (No model.)

*To all whom it may concern:*

Be it known that I, HENRY CARPENTER, of Edmond, in the county of Oklahoma, Territory of Oklahoma, have invented a new and useful Improvement in Draft-Equalizers, of which the following is a specification.

My invention is an improvement in draft-equalizers, and has for an object to provide a simple novel construction by which to avoid the side draft where the draft of the team is unequal on opposite sides of the tongue and where the draft of the vehicle or implement is harder on one side than on the other; and the invention consists in certain novel constructions and combinations of parts, as will be hereinafter described and claimed.

Figure 1:
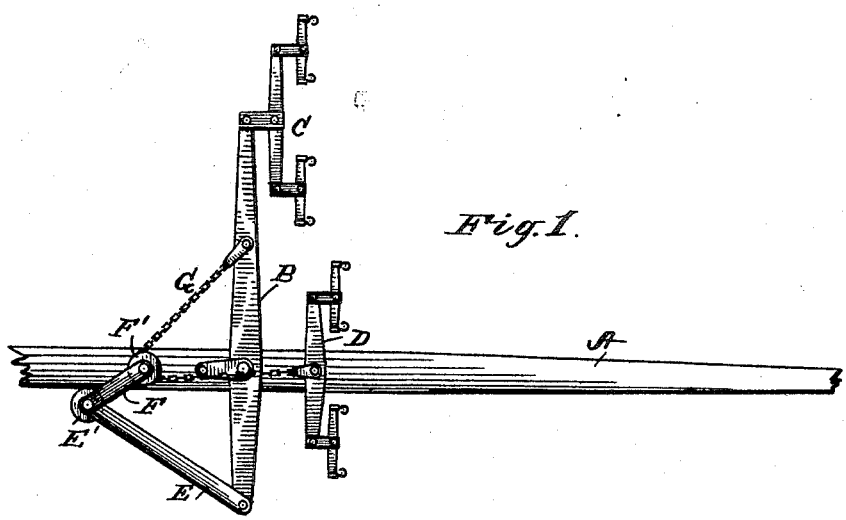
Figure 2:
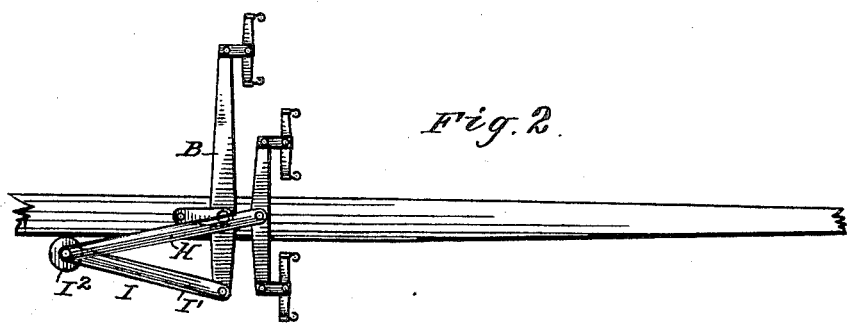
Figure 3:
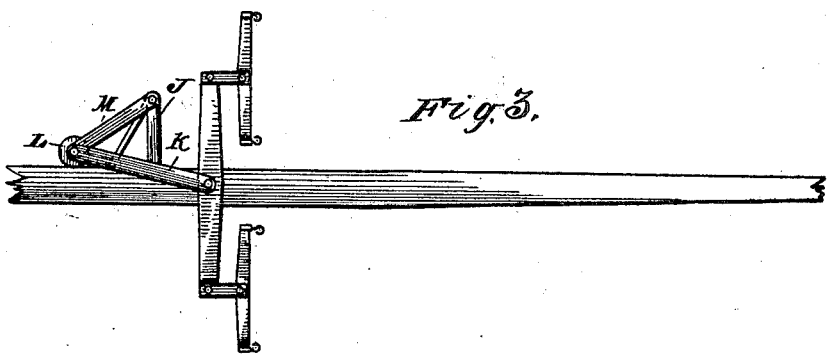

In the drawings, Figure 1 is a plan view of my invention embodied in a four-horse equalizer; and Figs. 2 and 3 are similar views, respectively, of a three-horse equalizer and a two-horse equalizer.

The broad idea of my invention common to the several constructions is a pusher operating in rear of the evener arranged to receive the draft of some or all of the horses, movable at its rear end alongside the tongue and having its front end supported laterally to the tongue, so the draft exerted on the pusher will be applied to one side of the tongue.

In Fig. 1 the tongue A has the evener B pivoted to it at a point about one-third the length of the evener distant from one end thereof, the long arm of the lever having a doubletree C pivoted to it, while the other doubletree D is movable at its center along the tongue, so one of the horses hitched to the doubletree D will pull on one side and the other horse on the other side of the tongue. To the outer end of the short arm of the evener is secured the front end of the pusher-bar E, whose rear end is movable alongside the tongue and is preferably provided with a roller E', rolling alongside the tongue. A link F is secured at one end to the rear end of the pusher-bar and extends forwardly therefrom, having at its front end a pulley F', around which passes a line G, which may be of wire, rope, or chain, and whose ends are connected one to the doubletree D and the other to the long arm of the evener at about one-third the distance from C to E. By this construction the draft exerted on the doubletree D operates to push on the outer end of the short arm of the evener and also equalizes the draft of the doubletree C by the connection of the line G with the long arm of the lever.

In the construction shown in Fig. 2 one horse is connected with the outer end of the long arm of the evener and the doubletree is connected by a rod or connection H with the rear end of the pusher I, the rod I' and roller I² of which are connected with the short arm of the evener and operate substantially like the corresponding parts in the construction shown in Fig. 1 and before described. In both Figs. 1 and 2 the lateral support for the front end of the pusher-bar is provided by the short arm of the evener.

In Fig. 3, which is a two-horse evener or evener where the draft is arranged equally on opposite sides of the tongue, I employ for the pusher a bar J, extending laterally from the tongue on the cutter side of a mower and in other cases on the side on which the draft is heaviest. This bar may be suitably braced and has pivoted to it near its outer end the front end of the pusher-bar K, provided at its rear end with the roller L and connected at such end by a rod M or other connection with the doubletree. By this construction, as by those shown in Figs. 1 and 2, the draft is exerted laterally to the tongue and may be so applied as to avoid side draft.

Having thus described my invention, what I claim as new, and desire to secure by Letters Patent, is—

1. The combination of the tongue, the evener, a pusher-bar connected at its front end with one arm of the evener laterally to the tongue and provided at its rear end with a roller moving alongside the tongue, a link connected at one end with the rear end of the pusher and having a pulley at its swinging end, and a draft-line passed around said pulley substantially as set forth.

2. The improved equalizer herein described comprising the tongue, the evener pivoted thereto and having the long and the short arms, the doubletree connected with the long arm, the doubletree slidable along the tongue, the pusher-bar connected at one end to the short arm and extending thence rearwardly and inwardly and movable at its rear end alongside the tongue, a pulley connected with the rear end of the pusher-bar and a line passed around said pulley and connected at one end to the long evener-arm and at its other end to the slidable doubletree substantially as set forth.

3. A draft-equalizer comprising the tongue, the evener, and the pusher-bar connected at its front end with one arm of the evener laterally to the tongue and movable at its rear end along the tongue, draft devices movable along the tongue, and connections between the rear end of the pusher-bar and said draft devices, such connection with the draft devices being arranged over the tongue, substantially as set forth.

4. In a draft-equalizer, the combination of the tongue, the evener, the pusher-bar connected at its front end with one arm of the evener, a pulley connected with the rear end of the pusher-bar, a draft-line passed around said pulley, and the draft devices and evener connected with the opposite ends of said line, substantially as set forth.

5. A draft-equalizer, comprising the tongue, the pusher-bar having a lateral support at its front end, a roller carried by the rear end of the pusher-bar and bearing against the tongue, and means for applying the draft to the pusher, substantially as set forth.

HENRY CARPENTER.

Witnesses:
JOHN M. ANGLEA,
C. H. PROFFITT.